(12) United States Patent
Wakisaka et al.

(10) Patent No.: US 12,442,682 B2
(45) Date of Patent: Oct. 14, 2025

(54) VIBRATION DETECTION DEVICE AND VIBRATION DETECTION METHOD

(71) Applicant: NTT, Inc., Tokyo (JP)

(72) Inventors: Yoshifumi Wakisaka, Musashino (JP); Daisuke Iida, Musashino (JP); Tatsuya Okamoto, Musashino (JP); Nazuki Honda, Musashino (JP); Hiroyuki Oshida, Musashino (JP)

(73) Assignee: NTT, Inc., Tokyo (JP)

( * ) Notice: Subject to any disclaimer, the term of this patent is extended or adjusted under 35 U.S.C. 154(b) by 235 days.

(21) Appl. No.: 18/025,683

(22) PCT Filed: Sep. 11, 2020

(86) PCT No.: PCT/JP2020/034577
§ 371 (c)(1),
(2) Date: Mar. 10, 2023

(87) PCT Pub. No.: WO2022/054254
PCT Pub. Date: Mar. 17, 2022

(65) Prior Publication Data
US 2023/0358599 A1    Nov. 9, 2023

(51) Int. Cl.
*G01H 9/00* (2006.01)
(52) U.S. Cl.
CPC .................. *G01H 9/004* (2013.01)
(58) Field of Classification Search
CPC ..................................................... G01H 9/004
See application file for complete search history.

(56) References Cited

U.S. PATENT DOCUMENTS 11,391,622 B2 * 7/2022 Ip ............................ G01H 9/004
11,566,937 B2 * 1/2023 Ip ........................ G01B 9/02015
(Continued)

FOREIGN PATENT DOCUMENTS

| CN | 108645500 B | * | 8/2020 | ............. G01H 9/004 |
| JP | 2001304823 A | * | 10/2001 | |
| WO | WO-2020071127 A1 | * | 4/2020 | ......... G01D 5/35361 |

OTHER PUBLICATIONS

Hiroyuki Iida, Yusuke Koshikiya, Fumihiko Ito, and Kuniaki Tanaka, "High-Sensitivity Coherent Optical Time Domain Reflectometry Employing Frequency-Division Multiplexing", J. Lightwave Technol. 30, 1121-1126 (2012).

(Continued)

*Primary Examiner* — John Fitzgerald
(74) *Attorney, Agent, or Firm* — Harness, Dickey & Pierce, P.L.C.

(57) ABSTRACT

A vibration detection apparatus is presented which can avoid occurrence of a point where detection sensitivity deteriorates in vibration detection of a scattered light intensity monitor according to optical frequency multiplexing. A multi-dimensional space having as many dimensions as the number of frequencies to be used, causes scattered light intensity change at each optical frequency to correspond to each axis, plots a scattered light signal as a vector on the space, performs linear approximation passing through an origin on the space having a plurality of plotted vector points as original data, and performs vibration detection using a direction vector of an approximate straight line obtained as a result of the approximation.

2 Claims, 4 Drawing Sheets

(56) References Cited

U.S. PATENT DOCUMENTS

11,867,555 B2 * 1/2024 Wakisaka ........... G01D 5/35358
2023/0358599 A1 * 11/2023 Wakisaka ............... G01H 9/004

OTHER PUBLICATIONS

Yahei Koyamada, Mutsumi Imahama, Kenya Kubota, and Kazuo Hogari, "Fiber-Optic Distributed Strain and Temperature Sensing With Very High Measurand Resolution Over Long Range Using Coherent OTDR", J. Lightwave Technol. 27, 1142-1146 (2009).

* cited by examiner

VIBRATION DETECTION DEVICE AND VIBRATION DETECTION METHOD

CROSS-REFERENCE TO RELATED APPLICATIONS

This application is a 371 U.S. National Phase of International Application No. PCT/JP2020/034577, filed on Sep. 11, 2020. The entire disclosure of the above application is incorporated herein by reference.

TECHNICAL FIELD

The present disclosure relates to a vibration detection apparatus according to frequency multiplexing using a time-domain reflection measurement method, and a vibration detection method thereof.

BACKGROUND ART

Problems of vibration detection of a scattered light intensity monitor using probe light having a single optical frequency will be described. It is assumed that a probe light pulse having a pulse number m is incident on an optical fiber to be measured and arrives at a point of a distance z from the incident end at a time $t_m$, and the intensity of an OTDR scattered light waveform obtained when the probe light pulse is Rayleigh backscattered and returned is $I(z, t_m)$. If a strain amount applied to the point z is $\varepsilon(t_m)$ at the time $t_m$ with a time $t_0$ as a reference state, it can be considered that the intensity linearly changes to the strain amount at many points in experience such as experiments when $\varepsilon(t_m)$ is as small as $10^1$ nanostrain order or less.

[Math. 1]

$$\Delta I(z, t_m) = I(z, t_m) - I(z, t_0) \cong \varepsilon(z, t_m) \cdot C(z) \tag{1}$$

Strictly speaking, a coefficient $C(z)$ depends on the shape and intensity of the probe light pulse and a distribution of Rayleigh scatterers at each point, and as a result, becomes a variable such as $I(z, T_0)$.

The coefficient $C(z)$ is affected by fading noise due to interference of scattered light of a large number of Rayleigh scatterers randomly distributed at each point, and the sign and the magnitude of the coefficient are different depending on each point, that is, the distance z from the incident end. The magnitude of a measured signal is represented by the following formula, where noise added at the time of measuring the intensity at each time is $n(t_m)$.

[Math. 2]

$$\Delta \tilde{I}(z, t_m) = \tilde{I}(z, t_m) - \tilde{I}(z, t_0) = \varepsilon(z, t_m) \cdot C(z) + [n(z, t_m) - n(z, t_0)] \tag{2}$$

The tilde is used to distinguish a measured value from an ideal value. It can be ascertained that sensitivity of vibration detection deteriorates at a point where the coefficient C is small.

In a method for measuring optical loss using OTDR, an optical frequency multiplexing method is known as a method for eliminating fading noise (refer to Non-Patent Literature 1, for example). In the method, a frequency multiplex pulse obtained by multiplexing frequencies by $f_k$ (k=1, 2, . . . , K) is used as probe light with each pulse number m. In addition, the method calculates scattered light intensity waveforms at each optical frequency $f_k$ represented by the following formula from an OTDR waveform obtained at each time through signal processing, averages the scattered light intensity waveforms as they are and uses the same as a signal.

[Math. 2a]

$$\tilde{I}_k(z, t_m) \tag{2a}$$

CITATION LIST

Non Patent Literature

[NPL 1] Hiroyuki Iida, Yusuke Koshikiya, Fumihiko Ito, and Kuniaki Tanaka, "High-Sensitivity Coherent Optical Time Domain Reflectometry Employing Frequency-Division Multiplexing," J. Lightwave Technol. 30, 1121-1126 (2012)

[NPL 2] Yahei Koyamada, Mutsumi Imahama, Kenya Kubota, and Kazuo Hogari, "Fiber-Optic Distributed Strain and Temperature Sensing With Very High Measurand Resolution Over Long Range Using Coherent OTDR," J. Lightwave Technol. 27, 1142-1146 (2009)

SUMMARY OF INVENTION

Technical Problem

Vibration detection although vibration detection of a scattered light intensity monitor is similar in the point where the scattered light intensity is used as a signal. However, in the vibration detection, there is a problem that it is difficult to avoid occurrence of a point where sensitivity deteriorates compared to measurement at a single frequency when scattered light intensity waveforms of formula 2a are averaged as they are.

This problem will be described in detail below. A change in scattered light intensity at a k-th frequency is represented by the following formula.

[Math. 3]

$$\Delta \tilde{I}_k = \tilde{I}_k(z, t_m) - \tilde{I}_k(z, t_0) = \Delta I_k(z, t_m) + [n_k(z, t_m) - n_k(z, t_0)] \tag{3}$$
$$= \varepsilon(z, t_m) \cdot C_k(z) + [n_k(z, t_m) - n_k(z, t_0)]$$

The sign and magnitude of a coefficient $C_k$ are independent. Further, noise $n_k(z, t_m)$ is independent with respect to the frequency number k and the time $t_m$.

In a method of simply calculating an intensity average, a signal intensity at the time $t_m$ with respect to the reference time $t_0$ is calculated as follows. K represents a frequency multiplexing number.

[Math. 4]

$$\frac{1}{K}\sum_k \tilde{I}_k(z, t_m) - \frac{1}{K}\sum_k \tilde{I}_k(z, t_0) = \tag{4}$$
$$\frac{1}{K}\Delta \tilde{I}_k(z, t_m) = \varepsilon(z, t_m) \cdot \frac{1}{K}\sum_k C_k(z) + \frac{1}{K}\sum_k [n_k(z, t_m) - n_k(z, t_0)]$$

Although it can be ascertained from the above formula that the effect of noise reduction can be obtained by averaging, since the effect that the proportional coefficient of the following formula multiplied by $c(z, t_m)$ becomes smaller than the original $C_k$ is greater than the effect of noise reduction because $C_k$ can have positive and negative values,

[Math. 4a]

$$1/K \sum_k C_k(z) \quad (4a)$$

it can be ascertained that a point where sensitivity deteriorates can be generated.

In other words, a point where sensitivity of vibration detection using an averaged signal deteriorates can be generated with respect to vibration detection using any frequency signal before frequency averaging is performed. As described above, in vibration detection of the scattered light intensity monitor, the method of simply averaging scattered light intensities of each frequency is not always optimal for improving sensitivity of vibration detection.

Meanwhile, in the optical frequency multiplexing method, it is general to perform coherent detection of backscattered light and separate signals of respective optical frequencies from differences in bands in the frequency domain obtained by Fourier-transforming detected signals. Although a signal corresponding to a scattered light intensity is obtained from the sum of the square value of an I (In-phase) component and the square value of a Q (quadrature) component by using values of the I component and the Q component at each separated optical frequency, the square root of the square value of the I component and the square value of the Q component, that is, the length of a vector on an IQ plane with the I component as a horizontal axis and the Q component as a vertical axis can also be used as a signal. It is also possible to detect vibration from change in this vector length.

In this case, the same conclusion can be obtained through the same concept as in the case of the above-described scattered light intensity when change in the strain amount $\varepsilon(t_m)$ is sufficiently small. More specifically, since the scattered light intensity $I(z, t_m)$ corresponds to the square of the length $L(z, t_m)$ of the vector, if respective changes are $\Delta I(z, t_m)$ and $\Delta l(z, t_m)$, within a range in which changes are insignificant, $$\Delta I(z,t_m)=2L(z,t_m)\cdot\Delta L(z,t_m).$$

is obtained.

The following formula is obtained if Math. 1 is used.

[Math. 4b]

$$\Delta L(z, t_m) = \epsilon(z, t_m) \cdot \left[\frac{C(z)}{2L(z, t_m)}\right] \quad (4b)$$

Therefore, assuming that $C'(z)=c(z)/2L(z, t_m)$, the vector length and the strain amount are proportional with respect to the proportional coefficient $C'(z)$. It is considered that this proportional relationship is established at many points if the strain amount is $10^1$ nanostrain order or less from the empirical rule by the inventors. Based on this, even in a case where a change in the vector length on the IQ plane is used as a signal, when vector lengths of respective optical frequencies are denoted as $L_k(z, t_m)$, it can be ascertained that the method of simply averaging the vector lengths is not optimal for improving sensitivity.

Accordingly, to solve the aforementioned problem, an object of the present invention is to provide a vibration detection apparatus and a vibration detection method which can avoid occurrence of a point where detection sensitivity deteriorates in vibration detection of a scattered light intensity monitor according to optical frequency multiplexing.

Solution to Problem

In order to achieve the above object, the vibration detection apparatus according to the present invention performs vibration detection in two processes of preliminary measurement and main measurement.

In the preliminary measurement, first, a Rayleigh scattered light intensity is acquired by a time-domain reflection measurement method after an optical frequency to be multiplexed is changed for each pulse. Then, as many direction vectors having temporal changes in the Rayleigh scattered light intensity obtained through the preliminary measurement as elements as a number obtained by subtracting one from the number of pulses used in the preliminary measurement are detected, and the plurality of detected direction vectors are statistically processed to create an approximate direction vector at each point of an optical fiber.

In the main measurement, vibration is detected by processing a signal obtained by the main measurement using the approximate direction vector.

By using the approximate direction vector, it is possible to select an optimum optical frequency at which sensitivity to strain change at each point of the optical fiber becomes the best, and thus the sensitivity can be improved as compared to the above-mentioned method for simply averaging vector lengths on the IQ plane.

Specifically, the vibration detection apparatus according to the present invention is a vibration detection apparatus using a time-domain reflection measurement method, including:

an optical tester that makes optical frequency multiplex pulses including a plurality of fundamental optical frequencies incident on an optical fiber and acquires a Rayleigh backscattered light intensity; and a control arithmetic unit that executes causing the optical tester to perform preliminary measurement in which the fundamental optical frequencies are changed by a moving optical frequency for each of the optical frequency multiplex pulses and are incident on the optical fiber to acquire a Rayleigh backscattered light intensity, detecting direction vectors having temporal changes in the Rayleigh backscattered light intensity with respect to the fundamental optical frequencies as elements for each point of the optical fiber on the basis of the Rayleigh backscattered light intensity acquired through the preliminary measurement, and statistically processing the direction vectors for each moving optical frequency to create an approximate direction vector, selecting an optimum fundamental optical frequency at which sensitivity to strain is highest for each point of the optical fiber using the created approximate direction vector, and causing the optical tester to perform main measurement in which the optical frequency multiplex pulses of the plurality of fundamental optical frequencies are incident on the optical fiber and vibration is detected from temporal changes in the Rayleigh backscattered light intensity with respect to the optimum fundamental optical frequency for each point of the optical fiber.

A vibration detection method of the vibration detection apparatus is a vibration detection method using a time-domain reflection measurement method, including:

performing preliminary measurement in which a plurality of fundamental optical frequencies included in optical frequency multiplex pulses are changed by a moving optical frequency for each of the optical frequency multiplex pulses and are incident on an optical fiber to acquire a Rayleigh backscattered light intensity;

detecting direction vectors having temporal changes in the Rayleigh backscattered light intensity with respect to the fundamental optical frequencies as elements for each point of the optical fiber on the basis of the Rayleigh backscattered light intensity acquired through the preliminary measurement, and statistically processing the direction vectors for each moving optical frequency to create an approximate direction vector;

selecting an optimum fundamental optical frequency at which sensitivity to strain is highest for each point of the optical fiber using the created approximate direction vector; and performing main measurement in which the optical frequency multiplex pulses of the plurality of fundamental optical frequencies are incident on the optical fiber and vibration is detected from temporal changes in the Rayleigh backscattered light intensity with respect to the optimum fundamental optical frequency for each point of the optical fiber.

In addition, another vibration detection apparatus according to the present invention is a vibration detection apparatus using a time-domain reflection measurement method, including:

an optical tester that makes optical frequency multiplex pulses including a plurality of fundamental optical frequencies incident on an optical fiber and acquires a Rayleigh backscattered light intensity; and a control arithmetic unit that executes causing the optical tester to perform preliminary measurement in which the fundamental optical frequencies are changed by a moving optical frequency for each of the optical frequency multiplex pulses and are incident on the optical fiber to acquire a Rayleigh backscattered light intensity, detecting direction vectors having temporal changes in the Rayleigh backscattered light intensity with respect to the fundamental optical frequencies as elements for each point of the optical fiber on the basis of the Rayleigh backscattered light intensity acquired through the preliminary measurement, and statistically processing the direction vectors for each moving optical frequency to create an approximate direction vector, and causing the optical tester to perform main measurement in which the optical frequency multiplex pulses of the plurality of fundamental optical frequencies are incident on the optical fiber, direction vectors having temporal changes in the Rayleigh backscattered light intensity with respect to the fundamental optical frequencies as elements are detected for each point of the optical fiber, and vibration is detected from inner products of the direction vectors and the approximate direction vector.

A vibration detection method of the vibration detection apparatus is a vibration detection method using a time-domain reflection measurement method, including:

performing preliminary measurement in which a plurality of fundamental optical frequencies included in optical frequency multiplex pulses are changed by a moving optical frequency for each of the optical frequency multiplex pulses and are incident on an optical fiber to acquire a Rayleigh backscattered light intensity;

detecting direction vectors having temporal changes in the Rayleigh backscattered light intensity with respect to the fundamental optical frequencies as elements for each point of the optical fiber on the basis of the Rayleigh backscattered light intensity acquired through the preliminary measurement, and statistically processing the direction vectors for each moving optical frequency to create an approximate direction vector; and performing main measurement in which the optical frequency multiplex pulses of the plurality of fundamental optical frequencies are incident on the optical fiber, direction vectors having temporal changes in the Rayleigh backscattered light intensity with respect to the fundamental optical frequencies as elements are detected for each point of the optical fiber, and vibration is detected from inner products of the direction vectors and the approximate direction vector.

The vibration detection apparatus and the method thereof perform preliminary measurement for intentionally changing an optical frequency to be multiplexed for each pulse such that an optimum result can be obtained for each point of an optical fiber to create an approximate direction vector at each point of the optical fiber, and perform selection of an optimum optical frequency having highest sensitivity to strain change, and the like, and thus can prevent local occurrence of sensitivity deterioration. Therefore, the present invention can provide a vibration detection apparatus and a vibration detection method which can avoid occurrence of a point where detection sensitivity deteriorates in vibration detection of a scattered light intensity monitor according to optical frequency multiplexing.

The above inventions can be combined as far as possible.

Advantageous Effects of Invention

The present invention can provide a vibration detection apparatus and a vibration detection method which can avoid occurrence of a point where detection sensitivity deteriorates in vibration detection of a scattered light intensity monitor according to optical frequency multiplexing.

DESCRIPTION OF EMBODIMENTS

Embodiments of the present invention will be described with reference to the accompanying drawings. The embodiments described below are examples of the present invention, and the present invention is not limited to the following embodiments. Note that, in the present specification and the drawings, the components having the same reference numerals indicate the same components.

Embodiment 1

Figure 1:
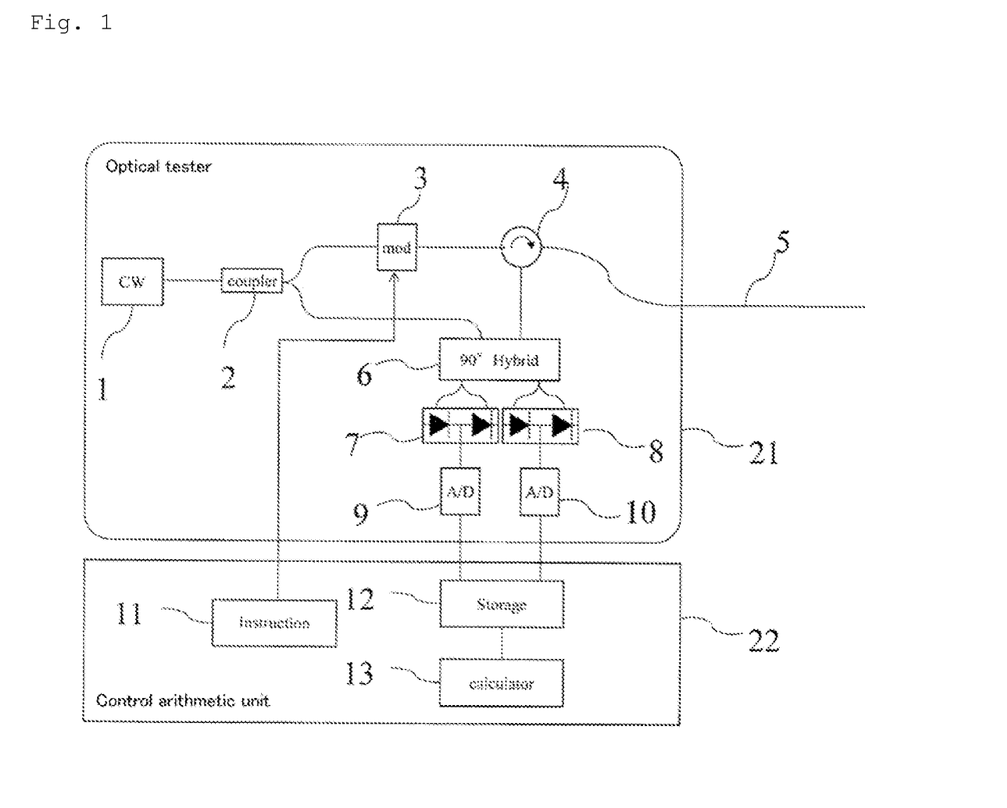
FIG. 1 is a diagram illustrating a vibration detection apparatus according to the present invention.

FIG. 1 is a diagram illustrating a vibration detection apparatus according to the present embodiment. The vibration detection apparatus is a vibration detection apparatus using a time-domain reflection measurement method including:

an optical tester 21 that makes optical frequency multiplex pulses including a plurality of fundamental optical frequencies $f_k$ incident on an optical fiber 5 and acquires a Rayleigh backscattered light intensity; and a control arithmetic unit 22 that executes an operation of causing the optical tester 21 to perform preliminary measurement in which the fundamental optical frequencies $f_k$ are changed by a moving optical frequency $\Delta f(m)$ for each of the optical frequency multiplex pulses and area incident on the optical fiber 5 to acquire the Rayleigh backscattered light intensity, an operation of detecting direction vectors having temporal changes in the Rayleigh backscattered optical intensity with respect to the fundamental light frequencies $f_k$ as elements for each point of the optical fiber 5 on the basis of the Rayleigh backscattered light intensity acquired through the preliminary measurement, and statistically processing the direction vectors for each moving optical frequency $\Delta f(m)$ to create an approximate direction vector, an operation of selecting an optimum fundamental optical frequency at which sensitivity to strain becomes the best for each point of the optical fiber 5 using the created approximate direction vector, and an operation of causing the optical tester 21 to perform main measurement in which the optical frequency multiplex pulses at the plurality of fundamental optical frequencies $f_k$ are incident on the optical fiber 5 and vibration is detected from temporal changes in the Rayleigh backscattered light intensity with respect to the optimum fundamental optical frequency for each point of the optical fiber 5.

First, the optical tester 21 will be described in detail. A CW laser is output from a laser 1 and branched into two by a coupler 2 to generate local light and probe light. The probe light is formed into probe pulses in which an optical frequency is multiplexed through a modulator 3 and is incident on the optical fiber 5 via a circulator 4. Scattered light generated by Rayleigh back scattering of the incident probe pulses is incident on an optical 90-degree hybrid 6 along with the local light, and an in-phase component and a quadrature component are respectively received through a balance photodiode 7 and a balance photodiode 8 and photoelectrically converted. The photoelectrically converted in-phase component is converted into a digital signal through an A/D converter 9, and the photoelectrically converted quadrature component is converted into a digital signal through an A/D converter 10.

Next, the control arithmetic unit 22 will be described in detail. A storage unit 12 stores the digital signals from the AD converters 9 and 10 as data. A calculation unit 13 executes calculation which will be described later using the stored data. An instruction unit 11 instructs the modulator 3 of the optical tester 21 to change an optical frequency.

Figure 2:
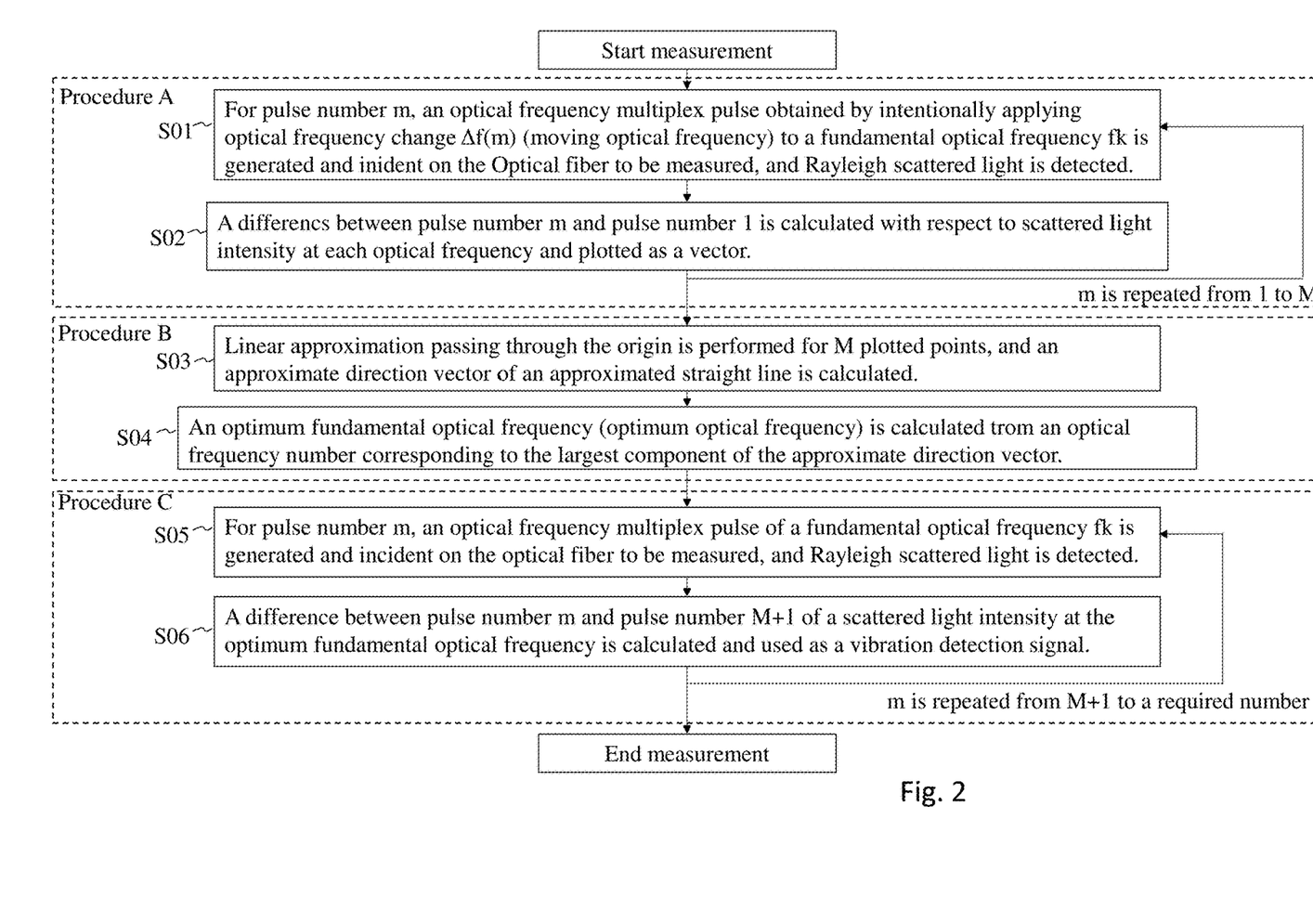
FIG. 2 is a diagram illustrating a vibration detection method according to the present invention.
Figure 3:
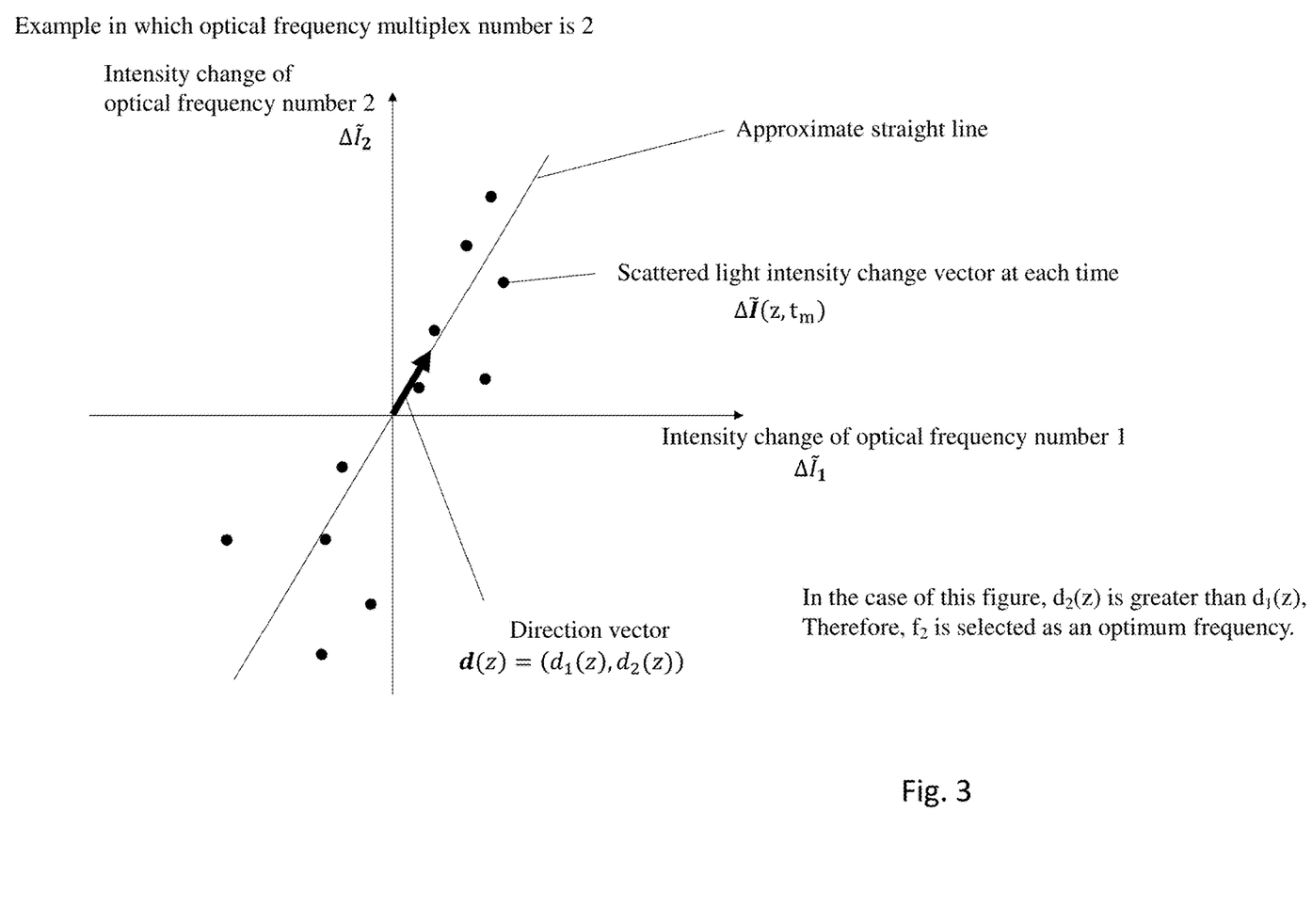
FIG. 3 is a diagram illustrating the principle of the vibration detection method according to the present invention.

FIG. 2 is a flowchart illustrating a vibration detection method performed by the present vibration detection apparatus. The present vibration detection method is a vibration detection method using a time-domain reflection measurement method including:

performing preliminary measurement in which a plurality of fundamental optical frequencies included in optical frequency multiplex pulses are changed by a moving optical frequency for each of the optical frequency multiplex pulses and are incident on an optical fiber to acquire a Rayleigh backscattered light intensity (step S01);

detecting direction vectors having temporal changes in the Rayleigh backscattered light intensity with respect to the fundamental optical frequencies as elements for each point of the optical fiber 5 on the basis of the Rayleigh backscattered light intensity acquired through the preliminary measurement (step S02) and statistically processing the direction vectors for each moving optical frequency to create an approximate direction vector (step S03);

selecting an optimum fundamental optical frequency at which sensitivity to strain becomes the best for each point of the optical fiber 5 using the created approximate direction vector (step S04); and making the optical frequency multiplex pulses at the plurality of fundamental optical frequencies incident on the optical fiber (step S05) and performing main measurement in which vibration is detected from temporal changes in the Rayleigh backscattered light intensity with respect to the optimum fundamental optical frequency for each point of the optical fiber (step S06).

This will be described in more detail using FIG. 2. The present vibration detection method includes

[procedure A] preparing frequency multiplex pulses in which frequencies have been intentionally changed by a moving frequency and acquiring preliminary data,

[procedure B] selecting an optimum fundamental frequency at each point based on analysis of the preliminary data, and

[procedure C] performing main measurement using frequency multiplex pulses with frequencies fixed to fundamental frequencies and detecting vibration from changes in a scattered light intensity of an optimum fundamental optical frequency.

[Procedure A]

Pulse number 1 to pulse number M (pulse number m; m is an integer in the range of 1 to M) are used to acquire preliminary data. Although M depends on the magnitude of noise of a measuring instrument, it is usually sufficient to have a value of about ten. Probe light in each pulse number is a frequency multiplex pulse obtained by multiplexing the frequency by K (optical frequency number k; k is an integer in the range of 1 to K). In particular, if the optical frequencies used for the main measurement in procedure C are referred to as fundamental frequencies $f_k$ (k=1, 2, . . . , K), frequencies constituting a frequency multiplex pulse in each pulse number m are set to $f_k + \Delta f(m)$ using the moving frequency $\Delta f(m)$ in this procedure. That is, when the oscillation frequency of the laser 1 is defined as $f_0$, the external modulator 3 applies frequency modulation of $f_k + \Delta f(m) - f_0$ to laser light to generate frequency multiplex pulses including K optical frequency components $f_k + \Delta f(m)$. However, it is assumed that $\Delta f(m)$ does not depend on the frequency number K. That is, the frequency multiplex pulse having pulse number 1 includes K optical frequency components obtained by shifting K optical frequencies $f_k$ by $\Delta f(1)$. The frequency multiplex pulse having pulse number 2 includes K optical frequency components obtained by shifting K optical frequencies $f_k$ by $\Delta f(2)$. In addition, the frequency multiplex pulse having pulse number M includes K optical frequency components obtained by shifting K optical frequencies $f_k$ by $\Delta f(M)$. The probe light intensity at each optical frequency is adjusted to be constant even if frequency change of $\Delta f(m)$ is applied.

As a method for generating such pulses, for example, it is possible to perform modulation of a total of $f_k + \Delta f(m) - f_0$ by performing modulation of $+f_k - f_0$ by an optical SSB modulator and performing modulation of $+\Delta f(m)$ by an acousto-optical modulator. However, any modulator 3 can be used if the desired modulation can be achieved and conditions that deterioration of a line width within pulses of frequency multiplex pulses with respect to a line width of the laser 1 used for measurement is equal to or less than a degree to which vibration can be detected can be satisfied.

Measurement is performed using the frequency multiplex pulses having the frequencies set in this way and the acquired data is stored in the storage unit 12 (step S01). With respect to each frequency number k (k=1, 2, ..., K), that is, with respect to each frequency $f_k+\Delta f(m)$, a change in the scattered light intensity corresponding to pulse number m, represented by the following formula, with respect to a scattered light intensity acquired at pulse number 1,

[Math. 4c]

$$\Delta \tilde{I}_k(z, t_m) \quad (4c)$$

is calculated by the calculation unit 13, and the following vector is plotted in a K-dimensional space (step S02).

[Math. 5]

$$\Delta \tilde{I}(z, t_m) = (\Delta \tilde{I}_1(z, t_m), \Delta \tilde{I}_2(z, t_m), \ldots, \Delta \tilde{I}_K(z, t_m)) \quad (5)$$

The change of the optical frequency of the probe light from $f_k$ to $f_k+\Delta f(m)$ can be regarded as equivalent to occurrence of strain represented by the following formula in the optical fiber 5 while the optical frequency of the probe light remains unchanged.

[Math. 5a]

$$-\frac{\Delta f(m)}{A f_k} \quad (5a)$$

Here, coefficient A is a constant having a value of about 0.78 in the case of an ordinary single mode fiber (refer to NPL 2, for example).

Since the magnitude of $f_k-f_0$ with respect to $f_0$ is sufficiently small, changes according to frequency modulation of the probe light of Math. 5a can be approximated to

[Math. 5b]

$$-\frac{\Delta f(m)}{A f_0} \quad (5b)$$

using $f_0$ instead of $f_k$. Therefore, the vector of Math. 5 can be developed to the following formula in consideration of actually applied strain change and noise.

[Math. 6]

$$\Delta \tilde{I}(z, t_m) = \left(\epsilon(z, t_m) - \frac{[\Delta f(m) - \Delta f(1)]}{A f_0}\right)(C_1(z), C_2(z), \ldots, C_k(z)) + \quad (6)$$
$$(n_1(z, t_m) - n_1(z, t_0), n_2(z, t_m) - n_2(z, t_0), \ldots, n_k(z, t_m) - n_k(z, t_0))$$

Here, when $\Delta f(1)$ in m=1 is set to zero, an apparent strain amount obtained by totaling the strain actually applied to the optical fiber and changes due to frequency modulation of the probe light becomes

[Math. 6a]

$$\epsilon(z, t_m) - \frac{\Delta f(m)}{A f_0} \quad (6a)$$

If $\Delta f(m)$ is small to a degree satisfying Math. 1 and is randomly changed in a range larger than noise, the apparent strain amount is not correlated with actual strain and can be changed with an amplitude larger than a noise level. That is, it is possible to create a situation equivalent to a state in which strain having an amplitude larger than that of noise is generated while changing with time at each point. Although actual setting of $\Delta f(m)$ depends also on the magnitude of noise of the measuring instrument, it is possible to handle the actual setting of $\Delta f(m)$ by setting the magnitude and sign such that they become random values for each pulse number between about −10 MHz to +10 MHz, or the like considering that Math. 1 is established with a strain amount of $10^1$ nanostrain order or less.

As described above, in procedure A, the vector of Math. 6 is plotted in the K-dimensional space for M pulses from m=1, 2, ..., M.

[Procedure B]

FIG. 2 is a schematic diagram illustrating the present procedure. In the present procedure, the calculation unit 13 performs fitting to a straight line passing through the origin by using the M vectors as original data. For example, the normal least square method or the like can be used. A unit vector (approximate direction vector) of the following formula indicating the direction of the approximate straight line by the fitting is obtained (step S03).

[Math. 6b]

$$d(z) = (d_1(z), d_2(z), \ldots, d_K(z)) \quad (6b)$$

The calculation unit 13 compares the magnitudes $|d_k(z)|$ of respective components of the approximate direction vector of Math. 6(b) and sets an index number corresponding to the largest component to $k_{opt}(z)$. Then, the calculation unit 13 sets an optimum frequency at the position z to $f_{opt}(z) = f_{k_{opt}}(z)$.

The significance of the present procedure will be described. The vector of Math. 6 is a constant factor of a vector $(C_1(z), C_2(z), \ldots, C_K(z))$ except for the influence of noise. Therefore, if an approximate straight line passing the origin is calculated for measurement data, the direction of the straight line can be used as an estimated value of the direction of the vector $(C_1(z), C_2(z), \ldots, C_k(z))$. Since the estimated vector direction becomes the approximate direction vector of Math. 6b, comparison of the magnitudes of the components of the approximate direction vector of Math. 6b is the same as comparison of the magnitudes of $C_k(z)$ if estimation accuracy is sufficiently high. As a result, $f_{opt}(z)$ is the optical frequency having the highest sensitivity to strain among multiplexed fundamental frequencies in a range in which Math. 1 is established. Therefore, $f_{opt}(z)$ can also be referred to as an optimum fundamental frequency.

[Procedure C]

The present procedure is main measurement. After pulse number M+1, pulses obtained by multiplexing the optical frequencies $f_k$ (k=1, 2, ... K) (pulses that are not shifted by $\Delta f(m)$) are generated by the modulator 3 and is incident on the optical fiber 5 as main measurement, and the scattered light intensity of Math. 2a is measured (step S05).

More specifically, with respect to pulse number M+1, a scattered light intensity at the optimum frequency $f_{opt}(z)$ at each position z is set to the following formula.

[Math. 6c]

$$\tilde{I}_{k_{opt}(z)}(z, t_{(M+1)}) \quad (6c)$$

With respect to pulse number M+2 and subsequent ones, a value obtained by subtracting the intensity corresponding to pulse number M+1, represented by Math. 6e, from a measured scattered light intensity represented by Math. 6d is set to signal $s(z, t_m)$, and vibration is detected from changes in this signal.

[Math. 6d]

$$\tilde{I}_{k_{opt}(z)}(z, t_m) \quad (6d)$$

[Math. 6e]

$$\tilde{I}_{k_{opt}(z)}(z, t_{(M+1)}) \quad (6e)$$

That is,

[Math. 7]

$$s(z, t_m) = \tilde{I}_{k_{opt}(z)}(z, t_m) - \tilde{I}_{k_{opt}(z)}(z, t_{(M+1)}) = [\in(z, t_m) - \in(z, t_{M+1})] C_{k_{opt}(z)}(z) + [n_{k_{opt}(z)}(z, t_m) - n_{k_{opt}(z)}(z, t_{M+1})] \quad (7)$$

The significance of the present procedure will be described. Since intensity change at the optical frequency $f_{opt}$ having the highest sensitivity to strain is used as the signal $s(z, t_m)$, sensitivity deterioration in vibration detection can be prevented except for a case where the sensitivity of vibration detection is low at all frequencies used if estimation of $f_{opt}$ in procedure B is correct.

Even if estimation of $f_{opt}$ in procedure B is wrong for other reasons that the influence of noise is large, a strain amount generated in the optical fiber during preliminary measurement is larger than the range in which Math. 1 is established, and Math. 1 is not established at optical frequencies used for measurement, it is possible to prevent occurrence of a point where vibration detection sensitivity deteriorates in principle as compared to a case where one of signals of respective optical frequencies used is used alone because any one of multiplexed optical frequencies is selected as a signal.

Except the process of calculating the scattered light intensity of Math. 2a at each frequency, vibration detection by the scattered light intensity monitor at a single optical frequency and the signal processing method are not changed, and thus calculation results can be rapidly output. Meanwhile, the signal $s(z, t_m)$ is calculated as a reference which becomes zero at a time $t_{(M+1)}$ which can be measured first in main measurement of procedure C.

The optical frequencies of the probe light pulses are intentionally changed from the frequencies used for main measurement in acquiring preliminary data (procedure A) in the present embodiment. However, when it is known that a fiber section to be measured is limited and vibration is naturally generated in the section, or when vibration can be artificially applied to the section, it is not necessary to change Δf(m) and preliminary data may be acquired using the fundamental optical frequencies used for main measurement as they are without intentionally changing them. Further, when vibration is detected after acquisition of all measurement data is completed, procedures up to procedure B may be performed using all the measurement data after all the measurement data is measured without distinguishing between preliminary data and main measurement data, and vibration may be detected from changes in the scattered light intensity at the optical frequency $f_{opt}$ as procedure C. In this case, if the calculation process up to procedure B is stored, it is not necessary to newly perform additional calculation in procedure C.

Although a change in an optical scattered light intensity is processed as a signal in the present embodiment, a change in a vector length on the IQ plane may be processed as a signal.

Embodiment 2

Figure 4:
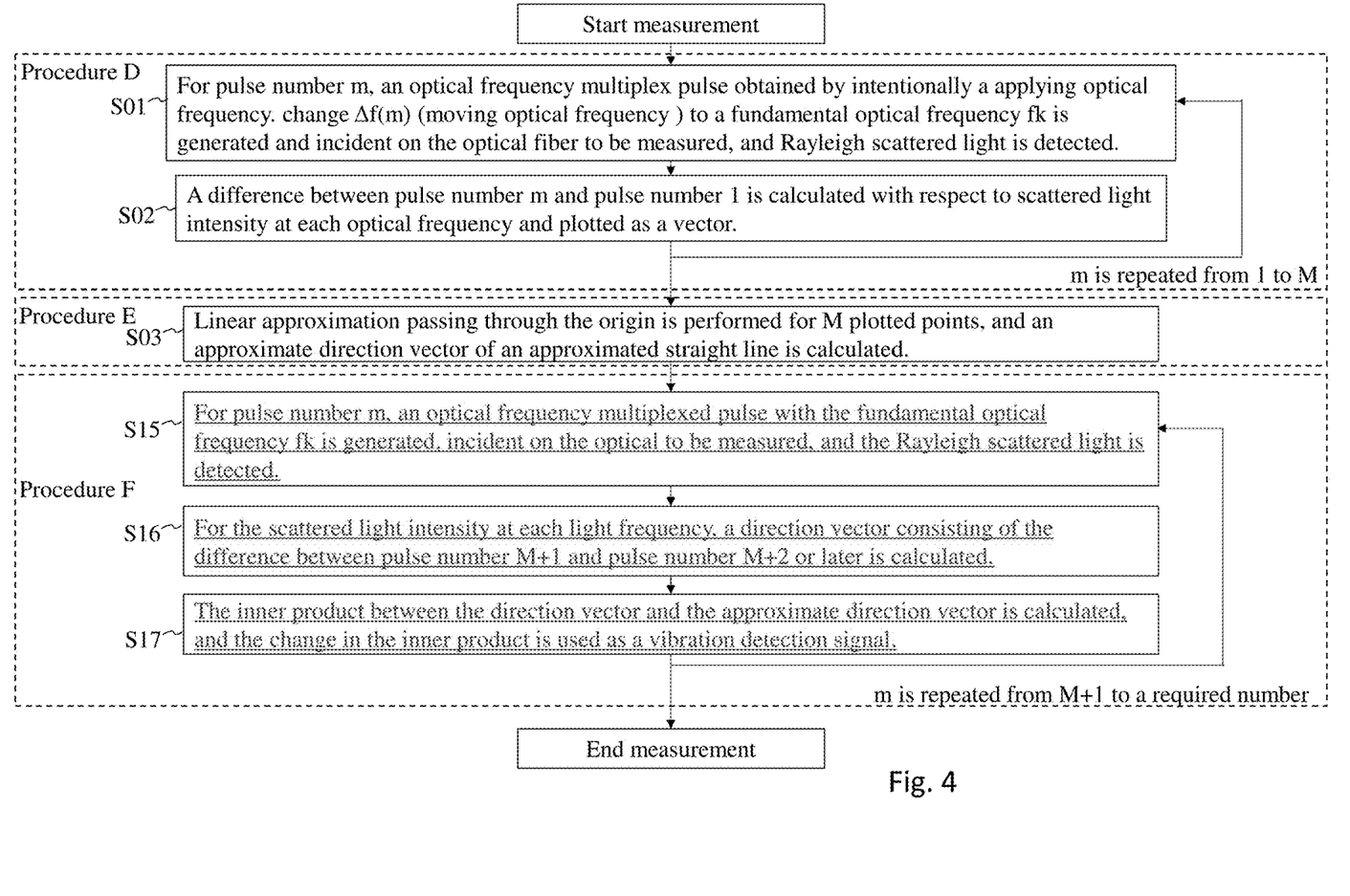
FIG. 4 is a diagram illustrating the vibration detection method according to the present invention.

The configuration of a vibration detection apparatus of the present embodiment is the same as the configuration of the vibration detection apparatus of FIG. 1. FIG. 4 is a flowchart illustrating a vibration detection method performed by the present vibration detection apparatus. The present vibration detection method is a vibration detection method using a time-domain reflection measurement method including:
performing preliminary measurement in which a plurality of fundamental optical frequencies included in optical frequency multiplex pulses are changed by a moving optical frequency for each of the optical frequency multiplex pulses and are incident on an optical fiber to acquire a Rayleigh backscattered light intensity (step S01);
detecting direction vectors having temporal changes in the Rayleigh backscattered light intensity with respect to the fundamental optical frequencies as elements for each point of the optical fiber on the basis of the Rayleigh backscattered light intensity acquired through the preliminary measurement, and statistically processing the direction vectors for each moving optical frequency to create an approximate direction vector (steps S02 and S03); and
performing main measurement in which the optical frequency multiplex pulses of the plurality of fundamental optical frequencies are incident on the optical fiber, direction vectors having temporal changes in the Rayleigh backscattered light intensity with respect to the fundamental optical frequencies as elements are detected for each point of the optical fiber, and vibration is detected from inner products of the direction vectors and the approximate direction vector.

This will be described in more detail using FIG. 4. The present vibration detection method includes
[procedure D] preparing frequency multiplex pulses by intentionally changing frequencies and acquiring preliminary data,
[procedure E] calculating an approximate direction vector at each point based on analysis of the preliminary data, and
[procedure F] detecting vibration from the inner product of a direction vector of changes in a scattered light intensity acquired by performing main measurement using frequency multiplex pulses with fixed frequencies and an approximate direction vector.

[Procedure D]
This procedure is the same as procedure A described in embodiment 1.

[Procedure E]
This procedure is the same as step S03 of procedure B described in embodiment 1. However, in the present procedure, selection of the optimum optical frequency in step S04 is not performed.

[Procedure F]

The present procedure is main measurement. After pulse number M+1, pulses obtained by multiplexing the optical frequencies $f_k$ (k=1, 2, ... K) (pulses that are not shifted by $\Delta f(m)$) are generated by the modulator 3 and is incident on the optical fiber 5 as main measurement, and the scattered light intensity of Math. 2a is measured (step S15).

Specifically, the calculation unit 13 calculates a direction vector as follows from a scattered light intensity measured with respect to pulse number M+1, represented by Math. 7a,

[Math. 7a]

$$\tilde{I}_k(z, t_{(M+1)})(k=1, 2, \ldots, K) \tag{7a}$$

and a scattered light intensity measured with respect to pulse number M+2 and subsequent ones, represented by Math. 7b (step S16).

[Math. 7b]

$$\tilde{I}_k(z, t_m)(k=1, 2, \ldots, K) \tag{7b}$$

[Math. 8]

$$s(z, t_m) = (\tilde{I}_1(z, t_m) - \tilde{I}_1(z, t_{(M+1)}), \tilde{I}_2(z, t_m) - \tilde{I}_2(z, t_{(M+1)}), \ldots, \tilde{I}_K(z, t_m) - \tilde{I}_K(z, t_{(M+1)})) \tag{8}$$

The inner product of the direction vector of Math. 8 and the approximate direction vector of Math. 6b, represented by Math. 8a, is used as a signal $s_2(z, t_m)$ in the present embodiment for signal detection (step S17).

[Math. 8a]

$$S(z, t_m) \cdot d(z) \tag{8a}$$

The significance of the present procedure will be described. On the assumption that the approximate direction vector of Math. 6b is correctly estimated, $s_2(z, t_m)$ is actually developed. However, it is assumed that Math. 8b can be established using a certain proportional constant D.

[Math. 8b]

$$d(z) = D(C_1(z), C_2(z), \ldots, C_K(z)) \tag{8b}$$

[Math. 9]

$$\begin{aligned}
s_2(z, t_m) &= \\
S(z, t_m) \cdot d(z) &= (\tilde{I}_1(z, t_m) - \tilde{I}_1(z, t_{(M+1)}), \tilde{I}_2(z, t_m) - \tilde{I}_2(z, t_{M+1}), \\
&\ldots, \tilde{I}_K(z, t_n) - \tilde{I}_K(z, t_{M+1}))) \cdot D(C_1(z), C_2(z), \ldots, C_K(z)) = \\
&\{[\epsilon(z, t_m) - \epsilon(z, t_{M+1})](C_1(z), C_2(z), \ldots, C_K(z)) + \\
&(n_1(z, t_m) - n_1(z, t_{M+1}), n_2(z, t_m) - n_2(z, t_{M+1}), \ldots, \\
&n_K(z, t_m) - n_K(z, t_{M+1}))\} \cdot D(C_1(z), C_2(z), \ldots, C_K(z)) = \\
&D\left\{[\epsilon(z, t_m) - \epsilon(z, t_{M+1})]\sum_k [C_k(z)]^2 + \sum_k C_k(z)[n_k(z, t_m) - n_k(z, t_{M+1})]\right\}
\end{aligned} \tag{9}$$

Math. 9 is compared with the signal $s(z, t_m)$ of Math. 7 of embodiment 1. For example,

[Math. 9a]

$$[n_k(z, t_m) - n_k(z, t_{M+1})] \tag{9a}$$

when the magnitude of a noise level in a statistical sense is set to $\Delta n$ instead of the value of Math. 9a, $\Delta n$ is independent of frequency and time. If the magnitude of $\Delta n$ is fixed, the SN ratio of $s_2(z, t_m)$ is as follows.

[Math. 10]

$$(SN \text{ Ratio of Embodiment 2}) = \frac{D|\epsilon(z, t_m) - \epsilon(z, t_{M+1})|\sum_k [C_k(z)]^2}{D\sqrt{\sum_k [C_k(z)]^2}\, \Delta n} = \frac{|\epsilon(z, t_m) - \epsilon(z, t_{M+1})|\sqrt{\sum_k [C_k(z)]^2}}{\Delta n} \tag{10}$$

On the other hand, the S/N ratio of embodiment 1 is as follows if there is no error in selecting the optimum frequency $f_{opt}(z) = f_{kopt(z)}$.

[Math. 11]

$$(SN \text{ Ratio of Embodiment 1}) = \frac{|\epsilon(z, t_m) - \epsilon(z, t_{M+1})||C_{k_{out}(z)}(z)|}{\Delta n} \tag{11}$$

Comparing Math. 10 to Math. 11, the method of embodiment 2 also incorporates changes in frequencies other than the frequency of Math. 11a by adding a process of calculating an inner product to the method of the embodiment 1.

[Math. 11a]

$$C_{k_{opt}(z)}(z) \tag{11a}$$

Therefore, if the approximate direction vector d(z) can be estimated with sufficient accuracy, the method of embodiment 2 improves sensitivity of vibration detection as compared to the method of embodiment 1.

The method of embodiment 2 can also perform calculation in the same manner when changes in a vector length on the IQ plane are handled as a signal, and comparison of SN ratios can also be described in the same manner.

When measurement at a shot noise limit using coherent detection is considered, $\Delta n$ is also regarded as constant in specific formula development of the S/N ratio at each point (a point corresponding to each distance z from the incident end) when changes in a vector length on the IQ plane are handled as a signal. On the other hand, when a scattered light intensity is handled, regarding $\Delta n$ as constant is correct as average evaluation, but as individual evaluation of each point, it is noted that dependence of $\Delta n$ on Math. 11b needs to be considered.

[Math. 11b]

$$\tilde{I}_k(z, t_m) \tag{11b}$$

The optical frequencies of the probe light pulses are intentionally changed from the frequencies used in the main measurement in acquiring the preliminary data (procedure D) as in description of embodiment 1. However, the optical frequencies used in the main measurement may be used as they are and the preliminary data may be acquired without intentionally changing the optical frequencies when it is known that a fiber section to be measured is limited and vibration is naturally generated in the section, or when vibration can be artificially applied to the section. Further, when vibration is detected after acquisition of all measurement data is completed, procedures up to procedure E may be performed using all the measurement data after all the measurement data is measured without distinguishing between the preliminary data and main measurement data, and vibration detection may be performed through procedure F.

OTHER EMBODIMENTS

The present invention is not limited to embodiment 1 and embodiment 2 and can be embodied in an implementation stage by modifying components and the signal processing method without departing from the scope of the invention. Further, the storage unit 12 and the calculation unit 13 included in the vibration detection apparatus of the present invention can be realized by a computer and a program, and the program can be recorded on a recording medium or can be provided via a network.

APPENDIX

The vibration detection apparatus and the method thereof of the present invention are described below.

As a method for detecting presence or absence and the place of vibration in vibration measurement using OTDR, a method for monitoring intensity change at each point of an OTDR waveform is known.

However, when vibration is small, intensity change and a strain amount are proportional to each other, but the magnitude of the proportional constant as well as the sign thereof is different for each point. Accordingly, at a point where the magnitude of the proportional constant is small, sensitivity of vibration detection deteriorates.

Therefore, the apparatus and method of the present invention are not a conventional method of simply averaging signal intensities of respective frequencies used to obtain optical loss, and include i) conceiving a multi-dimensional space having as many dimensions as the number of frequencies to be used and causing scattered light intensity change at each optical frequency to correspond to each axis,
ii) plotting a scattered light signal as a vector on the space,
iii) performing linear approximation passing through an origin on the space having a plurality of plotted vector points as original data, and
iv) performing vibration detection using a direction vector of an approximate straight line obtained as a result of approximation.

The vibration detection apparatus and the method thereof of the present invention can improve sensitivity of vibration detection according to frequency multiplexing. That is, it is possible to efficiently reduce the probability of erroneous detection of vibration according to optical frequency multiplexing while maintaining rapid calculation which is the advantage of intensity monitoring. Although it is not necessary to measure accurate waveforms of vibration, it can be expected to use the present invention for application in which a place and time at which vibration occurs and an approximate frequency of vibration are desired to be rapidly measured (intruder detection, identification of a facility location according to hitting at a site, and the like).

REFERENCE SIGNS LIST

1: Laser 1
2: Coupler
3: Modulator
4: Circulator
5: Optical fiber
6: Optical 90-degree hybrid
7, 8: Balance photodiode
9, 10: AD converter
11: Calculator
12: Storage unit
13: Calculation unit
21: Optical tester
22: Control arithmetic unit

The invention claimed is:

1. A vibration detection apparatus using a time-domain reflection measurement method, comprising:
   an optical tester that makes optical frequency multiplex pulses including a plurality of fundamental optical frequencies incident on an optical fiber and acquires a Rayleigh backscattered light intensity; and
   a control arithmetic unit that executes causing the optical tester to perform preliminary measurement in which the fundamental optical frequencies are changed by a moving optical frequency for each of the optical frequency multiplex pulses and are incident on the optical fiber to acquire a Rayleigh backscattered light intensity,
   detecting direction vectors having temporal changes in the Rayleigh backscattered light intensity with respect to the fundamental optical frequencies as elements for each point of the optical fiber on the basis of the Rayleigh backscattered light intensity acquired through the preliminary measurement, and statistically processing the direction vectors for each moving optical frequency to create an approximate direction vector, and
   causing the optical tester to perform main measurement in which the optical frequency multiplex pulses of the plurality of fundamental optical frequencies are incident on the optical fiber, direction vectors having temporal changes in the Rayleigh backscattered light intensity with respect to the fundamental optical frequencies as elements are detected for each point of the optical fiber, and vibration is detected from inner products of the direction vectors and the approximate direction vector.

2. A vibration detection method using a time-domain reflection measurement method, comprising:
   performing preliminary measurement in which a plurality of fundamental optical frequencies included in optical frequency multiplex pulses are changed by a moving optical frequency for each of the optical frequency multiplex pulses and are incident on an optical fiber to acquire a Rayleigh backscattered light intensity;
   detecting direction vectors having temporal changes in the Rayleigh backscattered light intensity with respect to the fundamental optical frequencies as elements for each point of the optical fiber on the basis of the Rayleigh backscattered light intensity acquired through the preliminary measurement, and statistically processing the direction vectors for each moving optical frequency to create an approximate direction vector; and
   performing main measurement in which the optical frequency multiplex pulses of the plurality of fundamental optical frequencies are incident on the optical fiber, direction vectors having temporal changes in the Rayleigh backscattered light intensity with respect to the fundamental optical frequencies as elements are detected for each point of the optical fiber, and vibration is detected from inner products of the direction vectors and the approximate direction vector.

* * * * *